Aug. 17, 1948.  H. R. BILLETER  2,447,109
TORQUE MEASURING WRENCH
Original Filed Oct. 27, 1943  4 Sheets-Sheet 1

INVENTOR.
Henry Robert Billeter,
BY
Fidler & Crouse
Atty's.

Aug. 17, 1948. H. R. BILLETER 2,447,109
TORQUE MEASURING WRENCH
Original Filed Oct. 27, 1943 4 Sheets-Sheet 4

INVENTOR.
Henry Robert Billeter,
BY
Fidler & Crone
Attys.

Patented Aug. 17, 1948

2,447,109

UNITED STATES PATENT OFFICE 2,447,109

TORQUE MEASURING WRENCH

Henry Robert Billeter, Highland Park, Ill., assignor to Ammco Tools, Inc., a corporation of Illinois Continuation of application Serial No. 507,827, October 27, 1943. This application November 7, 1945, Serial No. 627,192

12 Claims. (Cl. 73—139)

This invention relates to improvements in torque measuring wrenches.

An object of the invention is to provide a new type of torque measuring wrench.

Another object of the invention is to provide torque measuring wrenches embodying a new principle of construction having in its operation inherently higher accuracy of torque measurement than has been obtainable with heretofore known torque measuring wrenches.

Another object of the invention is to provide torque measuring wrenches of a new spring bar type with the operating handle rigidly mounted on the spring bar and the torque measuring accuracy of which is independent of the manner in which the operator may grasp the handle or apply force thereto.

Another object of the invention is to provide torque wrenches of simple and relatively inexpensive construction with a minimum number of parts and with very high accuracy in torque measurement.

Another object of the invention is to provide torque measuring wrenches combining light weight with rugged construction and inherently high accuracy in torque measuring operation.

Another object of the invention is to provide torque measuring wrenches having very high accuracy in torque measurement and which are of rugged construction capable of withstanding a maximum of rough handling and shock with a minimum effect on the accuracy of torque measurement.

Another object of the invention is to provide torque measuring wrenches, the torque measuring accuracy of which, for all practical purposes, is of the order of accuracy of the gauge mechanism which may be employed.

Another object of the invention is to provide torque measuring wrenches in which no frictional resistance exists in torque measuring operation except in the gauge mechanism which may be used.

Another object of the invention is to provide torque measuring wrenches without relative movement between contacting parts during torque measuring operation except in the gauge mechanism which may be employed.

Another object of the invention is to provide torque measuring wrenches of high accuracy requiring a minimum of machining of parts, other than gauge parts, in the manufacture thereof.

Another object of the invention is to construct a torque measuring wrench with simple and effective means to prevent overloading of the spring bar.

Another object of the invention is to construct a torque measuring wrench with a dial gauge mechanism and simple but effective means to prevent overactuation of the dial gauge mechanism and to prevent undue strain on the dial gauge parts.

Another object of the invention is to construct a torque measuring wrench with a dial gauge and simple but effective means to protect the dial gauge mechanism against damage from the effects of sudden release of the torque being measured such as is caused by breakage of the work, or by the operator permitting the wrench handle to slip out of his grasp or permitting the wrench to slip off of the work during a torque measuring operation.

Another object of the invention is to provide a highly accurate torque measuring wrench without a casing.

Another object of the invention is to provide torque measuring wrenches of small size relative to the magnitude of torque to be applied and measured thereby.

Another object of the invention is to provide a torque measuring wrench of the open-jaw type which is of simple construction and provides very high accuracy of torque measurement.

The foregoing and other objects and advantages of the invention will be dealt with in more detail in the following description, having reference to the accompanying drawings, in which—

Prior torque measuring wrenches are of various types and forms of construction. A very simple and relatively inexpensive torque measuring wrench is one of the simple spring bar type shown diagrammatically in Figs. 1 and 2. Such a wrench comprises a handle 20 which is rigid on one end of a spring-bar 21 having rigidly on its other end a work-engaging head member 22 formed, for example, with a squared portion 23 to fit in a socket of similar cross section in a member adapted to transmit torque to work, such as a bolt head or a nut. An arm 24 rigid with the work-engaging head extends back toward the handle 20 and may have its end positioned, as shown, over a calibrated scale 25 carried by the handle or may operate the indicator mechanism of a gauge. Such prior, simple spring-bar wrenches, as is well known, give torque measurement indications having serious errors dependent upon the manner in which the operator grasps the handle and applies the operating force thereto. More specifically, for a given torque applied to the work, the curvature of the longitudinal axis or center line of the spring-bar and the amount of deflection of the end of the spring-bar where it joins the operating handle vary with variations in the manner in which the operator grasps the handle and applies operating force to the handle. The operator may grasp the handle at different positions relative to the end of the spring bar. He may also apply force to the handle in such a manner that such applied force will act to rock or twist the handle about the juncture of the spring bar and handle with or without simultaneously applying torque to the work. Assuming application of the same torque to the work in every case by forces so applied to the handle that the resultants of such operating forces are, in each case, at right angles to the rest position of the handle axis, the deflection of the handle end of the spring bar increases as the point of intersection of the handle axis and the resultant of the operating forces applied to the handle to produce such torque is shifted along the handle axis away from the work and toward the outer free end of the handle. That phenomenon is illustrated diagrammatically in Fig. 3.

Figures 1, 2, 3, 4:
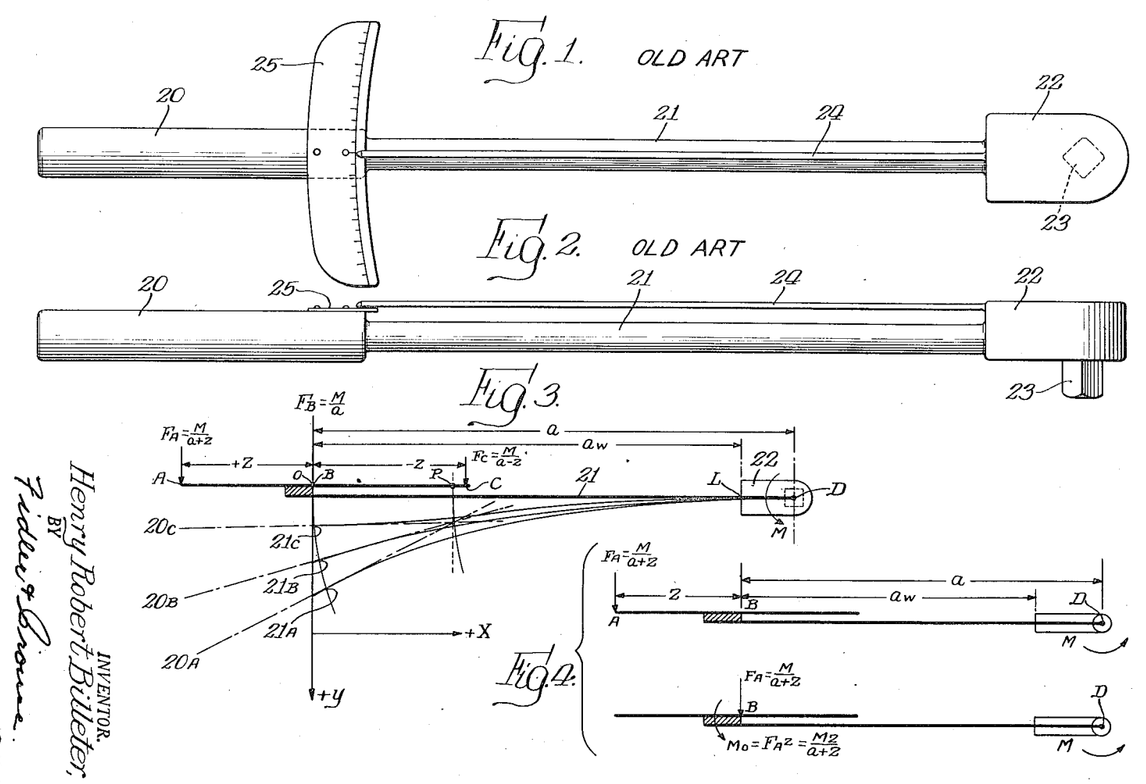
Figs. 1 and 2 are top and side elevations of a simple spring bar torque measuring wrench of a previously known type.
Fig. 3 is a diagrammatic illustration of certain phenomena manifested in the operation of the simple spring type of torque measuring wrench.
Figs. 4, 5 and 6 are analytical diagrams relating to certain aspects of such phenomena illustrating mathematical proof of the principles upon which the present invention is based.

In Fig. 3, $21_A$, $21_B$ and $21_C$ indicate the positions to which the end of the spring bar 21 joining the handle 20 is moved when the resultant of the operating forces applied to the handle 20 intersects the handle axis at three different points as indicated by the arrows $F_A$, $F_B$ and $F_C$, respectively, to apply to the work, in each case, the same torque indicated by the arrow M. The operating force resultants $F_A$, $F_B$ and $F_C$, of course, are not equal, $F_C$ being greater than $F_B$ which, in turn, is greater than $F_A$. The relative displacement between the scale 25 and the free end of the arm 24, or the displacement between the end of the arm 24 and a gauge carried by the handle 20 in the same location as the scale 25 and operated by the end of the arm 24, varies as the resultant of the operating forces intersects the handle axis at point A, B or C, though the same torque M is applied to the work in each case. Consequently, the torque measurement indications given by the pointer 24 and scale 25, or by a gauge arranged as above mentioned, will vary for a given torque applied to the work, depending upon where and how the operator grasps the operating handle and applies the operating force thereto. Furthermore, the application to the spring bar of a moment about the juncture of the spring bar and handle will cause the spring bar to have a deflection curve different from the deflection curve of the spring bar when loaded by a force normal to the spring bar, and the pointer will, therefore, give differing indications dependent upon whether or not the force applied to the handle by the operator consists of or comprises a component of force which produces a moment about the juncture of the spring and handle.

For any given torque, only one of such indications could possibly be correct and the other differing indications necessarily contain errors of varying magnitude. If the scale or gauge is calibrated to give correct torque readings when the operating forces are applied at the juncture of the handle 20 and spring bar 21, the readings obtained when the operating forces are applied at other points on the handle 20 will contain errors which increase in magnitude with increase of the distance between the juncture of the handle 20 and spring bar 21 and the point of application of the operating force. The errors will be positive when the resultant of the operating forces intersects the handle axis outwardly from the juncture of the handle 20 and spring bar 21, as at point A, and negative when such point of intersection is inwardly from said juncture toward the work-engaging head, as at point C.

In other words, the readings obtained from the previously known simple spring bar torque measuring wrenches will contain errors resulting from the variation in the moment arm through which the operating force acts in producing the torque applied to the work. Such errors increase in magnitude with increase in the difference between the moment arm through which the operating force acts in producing the torque applied to the work when taking such readings and the moment arm through which the operating force acted at the time of calibration of the scale or gauge, and will be positive when the moment arm is greater than the moment arm for which the calibration was made and negative when the moment arm is smaller than that for which the calibration was made.

To minimize errors due to variation of moment arm, torque wrenches have been made which have provisions for maintaining a constant effective moment arm of the operating force acting upon the spring bar. For example, the work-engaging head has been formed as a shaft journaled in one end of a case enclosing the spring bar and also having therein provisions to maintain a substantially fixed point of engagement between the free end of the spring bar and the case, the end of the case remote from the work-engaging head being provided with or formed as an operating handle. A gauge carried by the case is operated by an arm extending from the work-engaging head within the case to a point of engagement with a gauge operating member extending through the wall of the case. While such a constant moment arm wrench avoids the serious errors due to variation in moment arm in the simple spring bar wrench, the constant moment arm type of wrench is heavier because of the added case or other structure required to provide the necessary bearing or support for the work-engaging head and for the free end of the spring bar, and is more difficult and expensive to manufacture, not only because of the added structure but also because of the considerable machining required on various portions of the structure.

By the present invention there is provided a new type of torque measuring wrench, the simplicity of the structure of which is comparable with that of the above-discussed simple spring bar wrench, and which not only eliminates the errors due to variation of moment arm and application of twist to the handle in the simple spring bar wrench, but also eliminates other errors which affect the readings obtained from other wrenches due to friction between relatively moving contacting parts thereof and to inaccuracies of machining of parts. In producing the new type of torque measuring wrench, provisions to maintain a constant moment arm of the force acting on the spring bar are abandoned and eliminated. Instead, the new type of torque measuring wrench is constructed so that variation in moment arm of the operating force acting upon the spring bar is rendered incapable of producing any error in the torque measurements obtained from the wrench, as will be explained in detail hereinafter.

I have discovered that, in the operation of a torque measuring wrench of the simple spring bar construction to apply a given torque to the work, the different positions assumed by the operating handle axis as the resultant of operating forces applied to the handle intersects the handle axis at different points along the handle axis, form a pencil of lines having a common point of intersection. I have further discovered that for each value of torque applied to the work by means of a given wrench of simple spring bar construction, there is a similar pencil of lines corresponding to the different positions of the axis of the operating handle as the point of intersection of the handle axis and the resultant of the operating forces applied to the handle is shifted along the axis of the handle, and that the common points of intersection for the respective pencils of lines all lie on a locus constituted by a line which intersects the axis of the handle in the normal rest position of the latter at a point which can be predetermined in the designing of a torque measuring wrench. Then, by so placing the gauge and the gauge operating arm that the point of engagement between said gauge operating arm and the operating mechanism of the gauge is located at the predetermined point of intersection of the handle axis and the above-mentioned locus, the gauge will be operated to give, for each magnitude of torque applied to the work, a corresponding reading which is directly proportional to that torque and which is unaffected by shifting along the handle axis the point of intersection of the handle axis and the resultant of the operating forces applied to the handle. In other words, the point of engagement between the gauge operating arm and the operating mechanism of the gauge is located at a point from which the axis of the operating handle is always deflected to an extent directly proportional to and depending solely upon the magnitude of torque applied to the work regardless of where or how the operator grasps the operating handle and applies the operating force to produce such torque.

In order to disclose most fully and clearly the principles and manner of construction of the new torque measuring wrench, there will be given in the following, first, proofs of the existence of the pencil of lines having a common point of intersection and formed by the various positions of the handle axis when a given constant torque is applied to the work while the point of application of the operating force to produce such torque is shifted along the handle axis, and, second, proof of the existence of a locus of such points of intersection displaced from the normal rest position of the handle axis directly proportionally to the magnitudes of torque applied to the work by a given wrench. Then it will be clearly explained how the location of the point of engagement between the gauge operating arm and the operating mechanism of the gauge is to be determined from the dimensions of certain parts of the wrench whereby it is possible to manufacture various forms and sizes of wrenches, all giving very highly accurate torque measuring readings, regardless of where and how the operator may grasp the operating handle and apply the operating force to the handle. As will become obvious from the following description, such wrenches may be of very simple and inexpensive construction.

The validity of the principles upon which the new type of wrench of the present invention is based can, of course, be demonstrated with wrenches constructed in accordance with the invention. Further, the proper point longitudinally of the handle axis for location of a dial gauge or scale may be determined by actual measurement. The ease of such measurement will be directly proportional to the ease of measurement of the deflection of the handle through the useful torque range of the wrench. Proof of the validity of the principles of the new type of torque wrench also provides a formula by which the proper point of location of the dial gauge may be calculated with very high accuracy, particularly when the magnitude of deflection of the handle relative to the normal rest position thereof is small and more difficult to measure with the desired accuracy. In the proof of the validity of the principles of the new torque measuring wrench, the following symbols will be employed:

$D$ is the axis of the work, the pivotal axis of the work-engaging head 22 and the axis about which the moment of $F$ is computed.

$F$ (with various subscripts) is the resultant of the operating or loading force applied to the handle 20, it being assumed that $F$ is normal to the axis of the handle 20 and lies in a plane normal to the axis $D$.

$M$ is the working torque at $D$ produced by $F$.

$A$, $B$ and $C$ are the points of application of forces $F_A$, $F_B$ and $F_C$ respectively, each of which forces $F_A$, $F_B$ and $F_C$ is such as to produce the same torque $M$ at $D$, point $B$ also being the point at which the flexible spring bar 21 becomes integral with the rigid handle 20.

$L$ is the point at which the flexible spring bar 21 becomes integral with the rigid work-engaging head 22.

$z$ is the coordinate along the handle axis, measured from point $B$ (positive to the left, negative to the right), which indicates the point of application of $F$.

$a$ is the partial lever arm of the torque wrench, from point $B$ to point $D$.

$a+z$ is the total lever arm of the force $F$ about $D$.

$a_w$ is the flexible working length of the spring bar, that is, the distance from $B$ to $L$.

$E$ is the modulus of elasticity for the material of the flexible spring bar.

$I$ is the moment of inertia of the cross-sectional area of the spring bar, about its neutral axis.

$x$ is the coordinate along the normal rest position of the axis of the spring bar (positive to the right) measured from a vertical through point $B$.

$y$ is the coordinate along a vertical through point B (positive downward) measured perpendicular to the normal rest position of the axis of the flexible spring bar.

$z$ is the distance in the $-z$ direction along the movable handle axis, measured from B to the point whose deflection is measured by the dial gauge.

O is the origin of $x$ and $y$ coordinates, and is identical with the rest position of point B.

P is the point on the handle axis whose deflection from the $x$-axis is directly proportional to M.

The proof is based upon the theory of elasticity and assumes the following propositions:

1. The structure is assumed to undergo only elastic deflection.
2. Ordinary beam theory is applicable.
3. Deflections of a beam perpendicular to its axis vary directly with the load.
4. Cord and arc distances are equal. For small angles (flat curves) this obviously introduces no appreciable error. Furthermore, it will become apparent that the structure is such that, by inherent compensation, it excludes appreciable error from this source throughout the range of deflection of the spring bar of any practical torque measuring wrench.
5. The principle of superposition is validly applicable.
6. The handle 20 is rigid and non-flexible, so that the handle axis remains straight and tangent to the longitudinal axis or center-line of the spring bar 21 at the point B. It will be appreciated that the handle 20 may be made so that its flexibility will be so small as to be insignificant.
7. The work-engaging head 22 is rigid between points L and D; as in the case of the handle, so also the flexibility of the work-engaging head may be made so small as to be insignificant.
8. No friction or backlash need be considered. The structure of the new wrench may be such as to avoid all friction and backlash except such as may exist in the operating mechanism of the dial gauge so that the accuracy of a wrench constructed in accordance with the invention will be of the order of the accuracy of the dial gauge employed. Where a simple scale and pointer are employed there is no friction or backlash present.

In the first method of proof of the validity of the principles of the new type of torque wrench, the procedure will be to derive a general equation for the geometrical line of the handle axis which is tangent to the spring bar 21 (assumed to be of uniform cross-section) at the point B after deflection resulting from any force system acting on the handle which will produce the desired working torque M, and then to show that this general equation is that of a pencil of lines passing through a point coincident with the point P (defined as above) on the axis of the handle 20.

The moment M of a given value is produced at the point D by a force F which varies as the point of application of the force to the handle is shifted along the handle axis, it being $F_A$ at point A, $F_B$ at point B and $F_C$ at point C.

$$F_A \cdot (a+z) = M \text{ and } F_A = \frac{M}{a+z} \quad (1)$$

$$F_B \cdot a = M \text{ and } F_B = \frac{M}{a} \quad (2)$$

From (1) and (2)

$$F_B \cdot a = F_A \cdot a + F_A \cdot z \quad (3)$$

It is apparent that $z$ may be positive or negative. From elementary mechanics it is known that the force $F_A$ applied vertically on the axis of the handle 20 has an effect on the wrench as a whole which is the same identically as if $F_A$ is moved parallel to itself to the point B, unchanged in magnitude, and a pure moment $$M_0 = F_A \cdot z \quad (4)$$

is added at B. Then, from (1) and (4)

$$M_0 = F_A \cdot z = \frac{M \cdot z}{a+z} \quad (5)$$

This equivalence is indicated in Fig. 4.

The equation in slope-intercept form for the handle axis tangent to the deflected spring bar at B is $$y = v - Sx \quad (6)$$

where $v$ is the numerical deflection of the point B perpendicular to the normal rest position of the handle axis, and S is the slope of the curve of the axis of the deflected spring bar at B.

Figure 5:
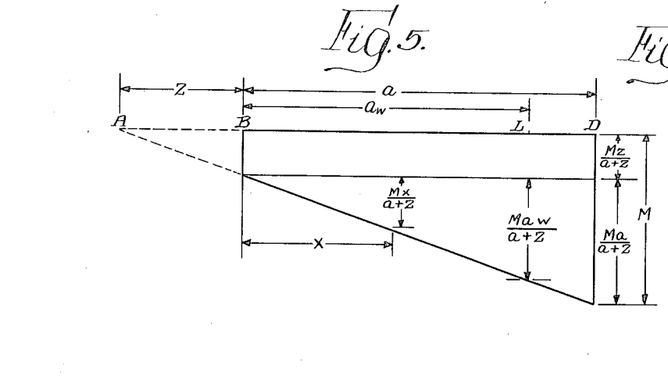

The moment diagram for the flexible spring bar and rigid working head is shown in Fig. 5 from which, using the moment-area proposition, $v$ and S are found to be $$v = \frac{M \cdot a_w^2}{6 \cdot E \cdot I} \cdot \frac{2a_w + 3z}{a+z} \quad (7)$$

and $$S = \frac{M \cdot a_w}{6 \cdot E \cdot I} \cdot \frac{3a_w + 6z}{a+z} \quad (8)$$

Substituting for $v$ and S, the Equation 6 for the handle axis becomes $$y = \frac{M \cdot a_w^2}{6 \cdot E \cdot I} \cdot \frac{2a_w + 3z}{a+z} - \frac{M \cdot a_w}{6 \cdot E \cdot I} \cdot \frac{3a_w + 6z}{a+z} \cdot x \quad (9)$$

Now, by setting $$R = \frac{a_w}{2a - a_w} \quad (10)$$

and $$K = \frac{3a - 2a_w}{6a - 3a_w} \quad (11)$$

the Equation 6 for the handle axis may be rewritten in the form $$y = \frac{R \cdot M \cdot a_w^2}{6 \cdot E \cdot I} - \frac{M a_w}{6 \cdot E \cdot I} \cdot \frac{3a_w + 6z}{a+z} \cdot (x - K a_w) \quad (12)$$

The identity of Equations 9 and 12 is verifiable by algebraic expansion and comparison, and it will be seen that the Equation 12 for the handle axis is a standard equation of the form $$y = b - m(x - c) \quad (13)$$

which is the equation for a pencil of lines of different slopes $m$, but all passing through the point $(c, b)$. Thus, for a given moment M at point D, all tangents to the curve of the deflected spring bar 21 at point B will pass through point P, the coordinates of which are (by comparing Equations 12 and 13)

$$x_p = K a_w = a_w \cdot \frac{3a - 2a_w}{6a - 3a_w} \quad (14)$$

and $$y_p = R \cdot \frac{M a_w^2}{6 \cdot E \cdot I} = \frac{a_w}{2a - a_w} \cdot \frac{M a_w^2}{6 \cdot E \cdot I} \quad (15)$$

which are obviously independent of $z$.

Only the slopes $m$ depend on $z$, i. e.—

$$m = \frac{M a_w}{6 \cdot E \cdot I} \cdot \frac{3a_w + 6z}{a+z} \quad (16)$$

From Equations 14 and 15, it will be noted that the $x$-coordinate of P is independent of the value of the moment M and that the $y$-coordinate of P is directly proportional to the moment M, which proves that there exists on the handle axis a point P which, for given values of $a$ and $a_w$, remains fixed longitudinally of the handle axis. In other words, for given values of $a$ and $a_w$, the point P has a fixed $x$-coordinate, and it is further proven that the $y$-coordinate of said point P, which is the magnitude of deflection of the point P perpendicular to the rest position of the handle axis, is directly proportional to the torque M but absolutely independent of the value of $z$, i. e., independent of the location of the point of application of the force F to the handle. Therefore, by so locating the dial gauge and gauge operating arm that the point of engagement between the gauge operating arm and the gauge operating mechanism coincides with the point P, the indication given by the dial gauge will be unaffected by shifting along the handle axis the point of application of the force F while maintaining a constant torque M at the point D.

A second method of proof involves the evaluation of the elastic energy W of the system $$w=\int_0^l \frac{M^2_x dx}{2 \cdot E \cdot I} \quad (17)$$

(where $M_x$ is the bending moment at the coordinate $x$) in terms of two loads, i. e., a load F and a fictitious load Q. The fictitious load Q is placed on the handle 20 at any distance $e$ in the negative $z$ direction from B.

Figure 6:
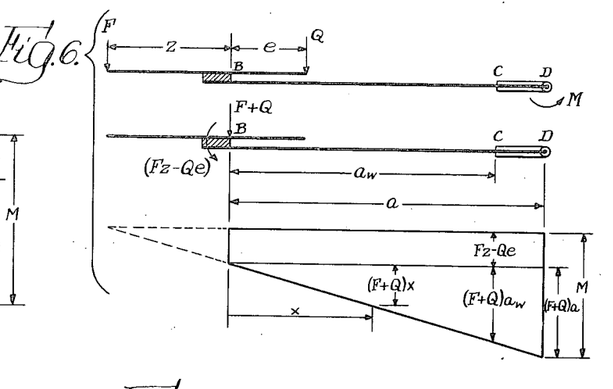

Fig. 6 shows the loading of the beam for this method and the moment diagram of the flexible spring bar 21 and work-engaging head 22. From Fig. 6

$$F=\frac{M}{a+z} \quad (18)$$

and $$M_x = \frac{M}{a+z} \cdot (x+z) + Q(x-e) \quad (19)$$

Substituting for $M_x$, Equation 17 becomes $$W = \frac{1}{2 \cdot E \cdot I} \int_0^{a_w} \frac{M}{a+z} \cdot (x+z) + Q(x-e)^2 dx \quad (20)$$

Applying the theorem of Castigliano, F alone causes, at the point of application of Q, a deflection $$y = \frac{dW}{dQ}\bigg]_{Q=0} \quad (21)$$

Then, differentiating with respect to Q before integrating, $$y = \frac{1}{E \cdot I} \int_0^{a_w} \left\{\frac{M}{a+z} \cdot (x+z) + Q(x-e)\right\} \cdot (x-e) dx \quad (22)$$

and, setting $Q=0$, $$y = \frac{1}{E \cdot I} \int_0^{a_w} \frac{M}{a+x}(xz+x^2-ez-ex)dx \quad (23)$$

$$= \frac{M}{E \cdot I \cdot (a+z)} \cdot \left[\frac{x^2 z}{2} + \frac{x^3}{3} - \frac{ezx}{1} - \frac{ex^2}{2}\right]_0^{a_w} \quad (24)$$

$$= \frac{M}{E \cdot I \cdot (a+z)} \cdot \left\{\frac{a_w^2 z}{2} + \frac{a_w^3}{3} - \frac{eza_w}{1} - \frac{ea_w^2}{2}\right\} \quad (25)$$

$$= \frac{M \cdot a_w}{6 \cdot E \cdot I \cdot (a+z)} \cdot (3a_w z + 2a_w^2 - 6ze - 3ea_w) \quad (26)$$

Substituting $$e = Ka_w = a_w \cdot \frac{3a - 2a_w}{6a - 3a_w} \quad (27)$$

[K being the same as in (11)] Equation 26 becomes $$y = \frac{M \cdot a_w^2}{6 \cdot E \cdot I} \cdot \frac{a_w}{2a - a_w} \quad (28)$$

so that $y$ has the same value as $y_p$ in Equation 15.

The result is identical with that of the first method, namely it is proved that a point P on the handle axis with an $x$ coordinate $$x_p = a_w \cdot \frac{3a - 2a_w}{6a - 3a_w} \quad (14)$$

has a deflection $$y_p = \frac{M a_w^2}{6 \cdot E \cdot I} \cdot \frac{a_w}{2a - a_w} \quad (15)$$

which is directly proportional to M and independent of $z$.

It can also be seen that if the operator acts upon the handle 20 in such a manner as to twist it about its juncture with the spring bar so as to apply a moment to the spring bar at its juncture with the handle, and regardless of the magnitude of such moment and of the relative magnitudes of such moment and of the force, if any, simultaneously applied to the spring bar transversely to its longitudinal axis, the deflection of the spring bar axis from its normal rest position at the above defined point P will always be directly proportional to torque M produced at point D and applied to the work and will be unaffected by the twisting of the handle by the operator.

From the foregoing it is indicated that the point P would move in a line perpendicular to the rest position of the handle axis and intersecting at the point $y_p = 0$, $$x_p = \frac{3a - 2a_w}{6a - 3a_w} \cdot a_w$$

this result having been obtained from operations based upon the assumption that the point B moves in a straight line perpendicular to the rest position of the handle axis. Actually, the point B moves in a curved line which, throughout the range of spring bar deflection in practical wrench construction, does not significantly depart from the arc of a circle centered at L. Likewise, the locus of the points of intersection of different pencils of lines formed by the handle axis for various magnitudes of torque produced at point D by operating forces F applied at a point shifting along the handle axis is also a curved line which, throughout the range of spring bar deflection in practical wrench construction, does not significantly depart from an arc of a circle centered at L, and which, for the small deflections encountered in the operation of torque measuring wrenches having dial gauges, does not significantly depart from a straight line normal to the normal rest position of the handle axis at the point P. Also, for the reason that when a dial gauge and gauge operating arm have been fixed upon the handle and work-engaging head, respectively, of a given wrench, the distance between the juncture of the spring bar with the operating handle and the point of contact between the gauge operating arm and the operating mechanism of the gauge remains fixed so that the distance BP along the axis of the wrench handle remains fixed during the operation of the wrench, no significant error can arise from the fact that the end B of the spring bar and the point P on the handle axis move in related curved lines instead of straight lines.

From the foregoing, it becomes apparent that a torque measuring wrench may be constructed which is without any provisions for maintaining a constant moment arm of the operating force acting on the spring bar to produce the torque applied to the work, but which will give very highly accurate torque measurements if the dial gauge and gauge operating arm are so secured to the operating handle and to the work-engaging head, respectively, that the point of engagement between the gauge operating arm and the operating mechanism of the dial gauge is located between the pivotal axis of the work-engaging head 22 and the juncture B of the spring bar 21 and operating handle 20 and at a distance from such juncture B of the spring bar 21 and operating handle 20 equal to $$x_p = a_w \cdot \frac{3a - 2a_w}{6a - 3a_w} \quad (14)$$

where $a$ is the combined length of the spring bar 21 and the work-engaging head 22 from the pivotal axis D of the work-engaging head 22 to the juncture B of the spring bar 21 with the operating handle 20 and $a_w$ is the free working length of the spring bar 21 from the juncture B of the spring bar 21 with the operating handle 20 to the juncture L of the spring bar with the work-engaging head 22.

Given the maximum value for the torque M to be applied to the work, the flexibility and length of the spring bar 21 may be chosen with reference to the equation $$y_p = \frac{Ma^2_w}{6 \cdot E \cdot I} \cdot \frac{a_w}{2a - a_w} \quad (15)$$

where $y_p$ is the deflection of the point P on the handle for the maximum value of M, E is the modulus of elasticity for the material of the flexible spring bar, and I is the moment of inertia of the cross-sectional area of the spring bar about its neutral axis, so that the deflections of the point P may be correlated to the operating parts of the dial gauge to be employed.

The loading or operating force to be applied to the handle to produce the torque M applied to the work will be $$F = \frac{M}{a + z} \quad (1)$$

Then the maximum deflection of the spring bar at its juncture with the operating handle, for the case of a given operating or loading force F, may be determined from the equation $$y_B = \frac{Ma^2_w}{6 \cdot E \cdot I} \cdot \frac{2a_w + 3z}{a + z} \quad (28)$$

and for the same case, the slope of the handle axis is determinable from the equation $$S_B = \frac{Ma_w}{6 \cdot E \cdot I} \cdot \frac{3a_w + 6z}{a + z} \quad (29)$$

Where the portion of the operating handle extending from the juncture of the operating handle with the spring bar to the point at which the dial gauge is supported on the handle is tubular or, at any rate, extends partially around the spring bar, such portion of the handle must be so designed as to permit of the free flexing of the enclosed or adjacent portion of the spring bar.

The foregoing formulae apply to a spring bar of uniform cross section throughout its flexing length. For a spring bar of non-uniform cross section, there will, of course, be some variation from the foregoing but the variation will not be of importance for such variations in the shape of the spring bar as may be practicably made.

Figure 7:
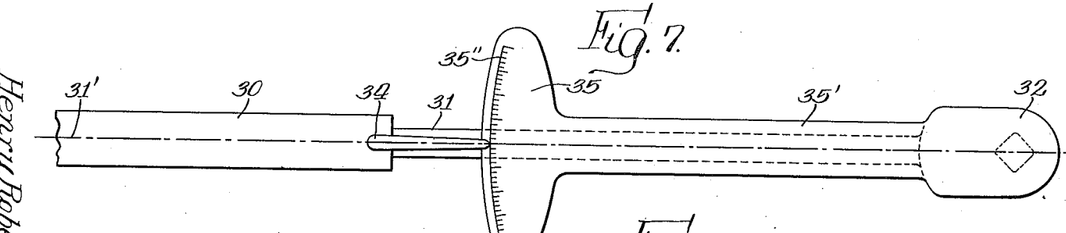
Figs. 7 and 8 are top and side elevations of a simple spring bar torque measuring wrench embodying the present invention.
Figure 8:
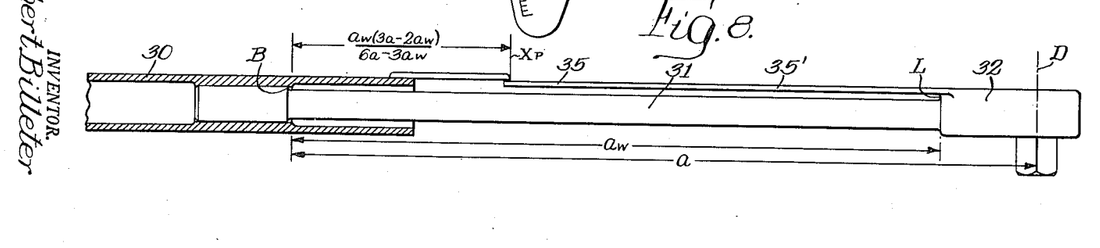

Figs. 7 and 8 show one form of torque measuring wrench embodying the invention, said wrench comprising a tubular operating handle 30 in which is rigidly secured one end of a spring bar 31, the other end of which has a rigid juncture with a work-engaging head 32. A scale member 35 is carried by an arm 35' rigidly secured to the work-engaging head 32, preferably by welding. The spring bar and work-engaging head may be joined in any suitable way to provide a rigid juncture between them, such as by forming the spring bar and work-engaging head integrally or by forming on an enlarged end of the spring bar a taper thread which may be screwed into a taper-threaded socket in the work-engaging head. The opposite end of the spring bar 31 is also enlarged and may be fitted rigidly in any suitable way within a portion of reduced diameter of the bore in the tubular handle 30, such as by force-fitting or shrink-fitting or by forming the latter enlarged end of the spring bar with a taper thread which may be screwed into a taper thread formed in the portion of reduced diameter of the bore of the handle 30 to effect the required rigid connection. Rigidly secured on the inner end of the operating handle 30, by welding or in other suitable ways, is an indicating finger 34 having its free end formed with a point positioned above a scale 35'' on the scale member 35 at a horizontal distance from the rigid juncture of the spring bar 31 and operating handle 30 equal to $$\frac{a_w(3a - 2a_w)}{6a - 3a_w}$$

where $a_w$ is the working length of the flexible spring bar 31 between its rigid juncture B with the operating handle 30 and its rigid juncture L with the work-engaging head 32 and $a$ is the distance along the longitudinal center line of the spring bar 31 from the rigid juncture B of the flexible spring bar 31 with the operating handle 30 to the axis of rotation D of the work-engaging head. The face of the scale member 35 is arranged at right angles to the plane containing both the longitudinal center line of the spring bar 31 and the axis of rotation D of the work-engaging head. The reading line of the scale 35'' intersects said plane in the same vertical line $x_p$ as the pointed end of the indicator finger 34, that is, at a horizontal distance $$\frac{a_w(3a - 2a_w)}{6a - 3a_w}$$

from the rigid juncture of the spring bar 31 of the operating handle 30. The reading line of the scale 35'' may be formed either as a trace of the pointed end of the indicator finger 34 when the wrench is operated to apply torque in each direction about the axis D or may satisfactorily be formed as the arc of a circle lying in the plane of the face of the scale member 35 and centered on a vertical line through the intersection of longitudinal center line 31' of the spring bar 31 and the plane of juncture of the spring bar 31 and work-engaging head 32. The scale is calibrated suitably in dependence upon the flexibility of the particular spring bar 31 employed.

The torque measuring wrench constructed as above described with reference to Figs. 7 and 8 will, for the reasons shown by the previously given proofs of the new principles of operation of wrenches embodying the present invention, give accurate readings free from errors arising from variation in the place or manner in which the operator grips the operating handle and applies operating force thereto.

In practice, it is found that calculation by means of the foregoing formula results in placing the point of meeting of the pointer 34 and scale member 35 at substantially one-third the distance from the handle member toward the head member. The effect of so locating the indicating means is, when stated generally, that the flexing of the spring bar between said point and the handle compensates for variations in flexing of the entire spring bar due to variations in the manner in which the pressure is applied to the handle member.

From the foregoing it will further be obvious that the mounting of the indicating pointer 34 and scale member 35 may be reversed, that is, the pointer may be rigidly supported on the work-engaging head 32 and the scale member rigidly supported on the operating handle 30, the pointed end of the indicating pointer and the reading line of the scale 35", in any case, being positioned, when the wrench is in its normal rest condition, exactly as described with reference to Figs. 7 and 8.

A further and preferred form of torque-measuring wrench embodying the invention is shown in Figs. 9 to 13, wherein the spring bar 41 is formed integrally with the rigid work-engaging head 42, to which is rigidly secured, preferably by welding, a dial gauge operating arm 45. The other end of the spring bar 41 is enlarged to provide, by force-fitting, shrink-fitting or in any other suitable ways, a rigid connection between said spring bar and the operating handle 40 in a portion of reduced diameter of the bore of said handle. The inner end of the handle 40, that is the end nearest the work-engaging head 42, has rigidly secured thereto a fitting 46 which carries a dial gauge 47. The operating mechanism of the dial gauge is operated by a lug or finger 50 formed on the free end of the gauge operating arm 45, acting on a slide member 51 slidable in a channel in the base 52 of the dial gauge 47, Fig. 11, and having an elongated notch therein to form shoulders 53 and 54 for engagement with the lug 50 on the dial gauge operating arm 45. A toothed rack member 55 is located in a slideway 56 in the slide 51, being slidable therein between limits determined by shoulders 57 and 58 of the slide 51 at the ends of said slideway 56. The rack 55 meshes with a pinion 59 secured on the pointer shaft 60 (Fig. 12) carrying the pointer 61 to swing the latter above a calibrated scale on a scale card or plate 65 above the base member 52 and under a transparent closure or window 66 carried by the annular housing ring 67 rotatably secured to the dial gauge base 52. The pinion 59 also meshes with a partially toothed and partially knurled disk 62 partially enclosed in a recess in the base member 52 so that its knurled portion projects out of the dial gauge sufficiently to permit the disk 62 to be rotated by the finger of the operator.

Figure 11:
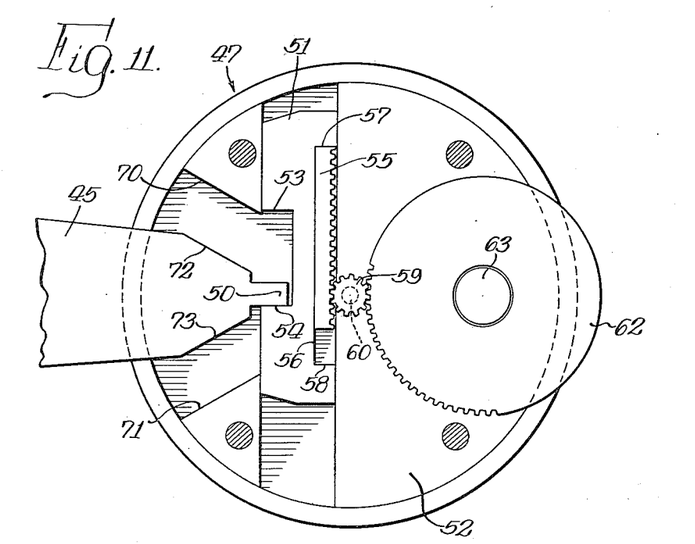
Fig. 11 is a bottom plan view of the dial gauge mechanism and the gauge operating member of the wrench of Figs. 9 and 10.
Figure 12:
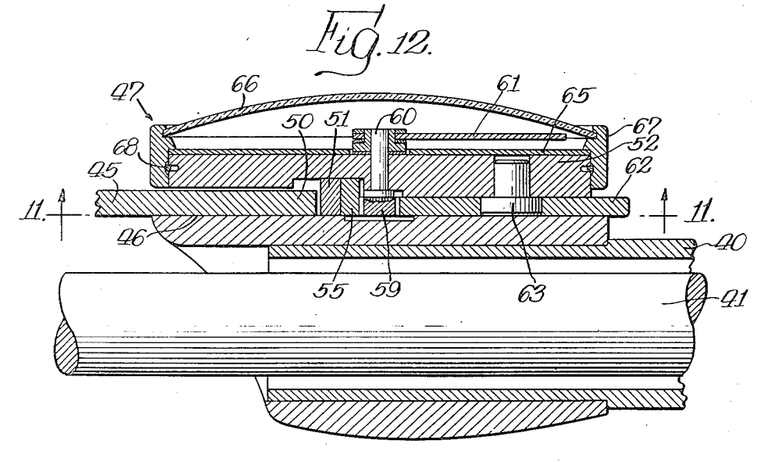
Fig. 12 is a section through the dial gauge and the gauge-supporting and gauge-operating elements of the wrench of Figs. 9 and 10 taken in a vertical plane containing the longitudinal axis of the operating handle.

It will be apparent that the operator, by rotating the disk 62 by means of his finger, may rotate the pinion 59 to take up the play or lost motion in either direction between the rack 55 and slide 51 and then, by continued rotation of the disk 62 in the same direction, may shift the slide 51 to take up lost motion in the same direction between the slide 51 and the lug 50 on the gauge operating arm 45. The pointer 61 will then be in a "0" position. The outer gauge housing ring 67 is rotatably secured on the base plate 52 of the gauge by means of an annular spring 68 located in a peripheral groove in the plate 52 and normally projecting partially into an internal annular groove in the inner wall of the ring 67 whereby the ring 67 may be rotated on the plate 52 and is held in adjusted rotative position by friction. A lug 69 formed on the periphery of the scale card or plate 65 engages in a notch in the ring 67 whereby the card or plate 65 will be rotated by rotation of the ring 67 whereby the operator may locate the zero line on the scale on the plate 65 beneath the end of the pointer 61 after having rotated the disk 62 to take up lost motion in the gauge mechanism in the desired direction. When it becomes desirable to perform a torque measuring operation in which the torque is to be applied to the work in the reverse direction, the disk 62 may be rotated by the finger of the operator, this time in the direction opposite to that in which it was previously rotated, whereby lost motion between the parts of the gauge mechanism will be taken up in the proper direction to permit of the desired torque measuring operation. The parts of the gauge mechanism, including specifically the pinion 59, the rack 55, and the shoulders 53, 54, 56 and 57 on the slide 51 are so proportioned and arranged that rotation of the disk 62 to take up lost motion in the gauge parts in either direction will always bring the pointer 61 to the same position, the arrangement and proportioning of the gauge mechanism parts being such that the lost motion therein corresponds to one complete rotation of the pointer 61.

By such construction of the gauge mechanism, including specifically the slide 51 and rack 55, the gauge mechanism is protected against damage resulting from breakage of the work, the operator permitting the gauge handle to slip from his grasp or permitting the work-engaging head to slip out of engagement with the work during a torque measuring operation. The action of the spring bar 41 under such conditions will cause the wrench handle 40 to snap back beyond its normal position relative to the gauge operating arm 45, thereby causing exceedingly rapid relative movement of the lug 50 away from one of the shoulders 53 or 54 toward the other of said shoulders. However, under such conditions the lug 50 will not strike said other shoulder of the slide 51 because of the degree of spacing between the shoulders 53 and 54, and injury such as might be caused by extremely rapid movement of the slide 51 and rack 55 is thus prevented.

By the same means, lost motion in the dial gauge mechanism is prevented from undesirably influencing the torque measurement readings obtained.

The base plate 52 of the dial gauge is also recessed to accommodate the end of the gauge operating arm 45 and the lug 50 thereon. The portions of the plate 52 at opposite sides of the recess constitute stops 70 and 71 which are so spaced apart in relation to the corresponding sides 72 and 73 of the end of the arm 45 that the arm 45 will be engaged with one or the other of said stops 70 and 71 before the operating force applied to the wrench can be increased sufficiently to overload the spring bar 41, and the operating arm 45 is formed of such material and dimensions as to be capable of preventing overload of the spring bar even if the force applied to the wrench be increased greatly above the torque measuring range of the wrench. The stops 70 and 71 also prevent overactuation of the dial gauge mechanism and so protects the latter from damage which might result from overactuation.

Figure 13:
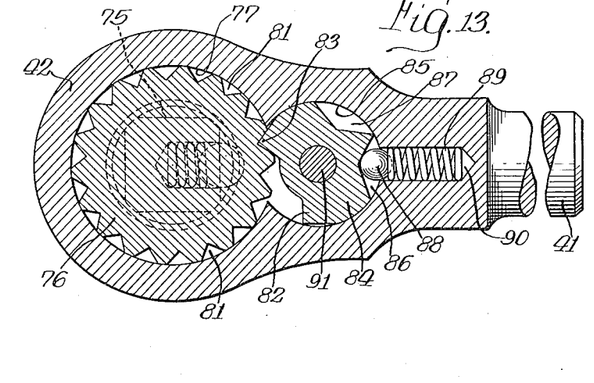
Fig. 13 is a partial horizontal section through the ratchet means in the work-engaging head.

The wrench may be applied to the work by means of any suitable work adapter formed with a squared recess adapted to receive a squared portion 75 of a member 76 located in a bore 77 in the work-engaging head 42 and having an upper hub 78 in a bearing formed in the work-engaging head and a lower hub 79 having a bearing in a plate 80 secured in the work-engaging head at the lower end of the bore 77. The portion of the member 76 between the hubs 78 and 79 is formed with notches 81 adapted to receive one or the other of two teeth 82 or 83 formed on a ratchet pawl 84 received in a recess 85 in the work-engaging head 42. The ratchet pawl is formed with two notches 86 and 87, each adapted to partially receive a ball 88 adapted to be pressed into either of said notches by a spring 89 enclosed in a bore 90 in the work-engaging head. The pawl 84 is formed with a bore through which passes a shaft 91 having a bearing in the work-engaging head below the pawl 84 and formed with an enlarged head 92, the lower portion of which has a bearing in the work-engaging head above the pawl 84. The outwardly exposed portion of the head 92 is knurled to permit of manual rotation thereof by the operator. The member 91, 92 is retained in place in the work-engaging head by a split ring 93 received partially in a peripheral groove in the member 91, 92 and partially in an annular groove in the work-engaging head. The portion 92 also has secured therein a stud 94, the lower end of which projects into a radial groove 95 in the upper face of the pawl 84 whereby the operator, by grasping the knurled exposed portion of the head 92, may rotate the member 91, 92 and, through the stud 94, also rock the ratchet pawl 84 from a position where one of the teeth 82, 83 cooperates with the notches 81 to a position where the other of the pawl teeth cooperates with the ratchet notches 81, the pawl 84 being yieldingly held in either of said positions by engagement of the ball 88 in one or the other of the notches 86 or 87. The above-described construction provides a sturdy, dependable and trouble-free ratchet means of simple construction and easy manufacture.

Figure 14:
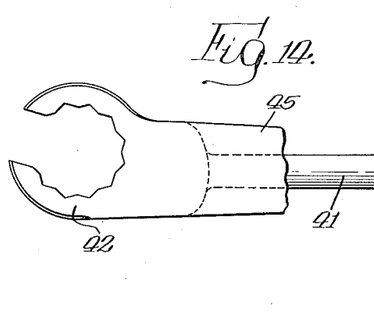
Fig. 14 shows a modified form of work-engaging head.

In place of the above-described construction of the work-engaging means of the wrench, the work-engaging head itself may be formed with a work-engaging socket suitable for a work of a given type, the form of work-engaging head illustrated in Fig. 14 being particularly suited for use on tubular fittings and for other uses for which a socket wrench is not usable.

Figure 9:
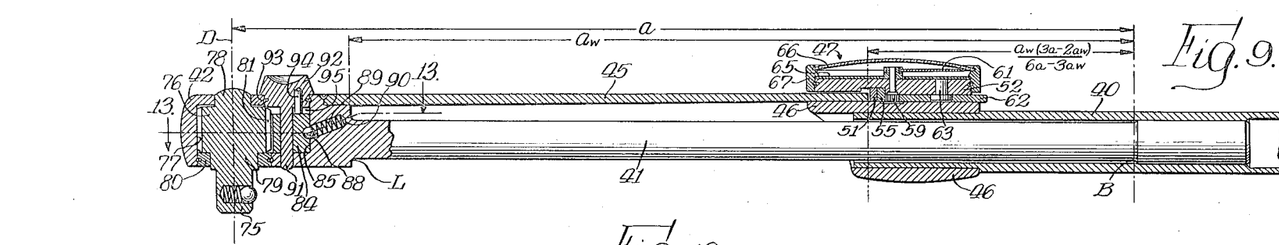
Figs. 9 and 10 are a longitudinal vertical section and a top elevation, respectively, of a modified and preferred form of torque measuring wrench embodying the invention.
Figure 10:
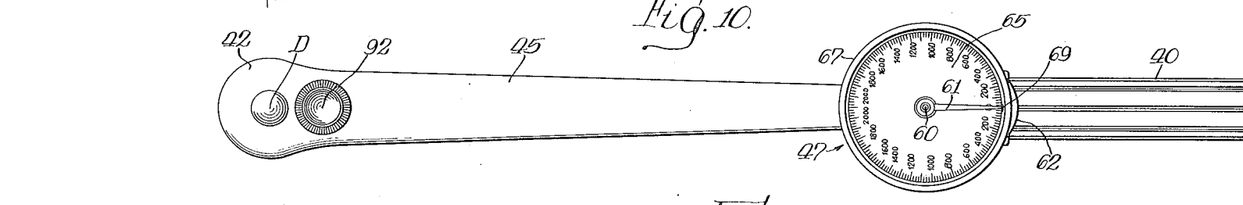

In the wrench employing the gauge mechanism of the kind shown in Figs. 9-12, the gauge mechanism and lug 50 are so located on the handle 40 and arm 45 that the point of engagement between the lug 50 and the slide 51, while the wrench is in its normal rest condition, is displaced horizontally toward the juncture of the spring bar 41 with the rigid work-engaging head 42 and away from the juncture of the spring bar 41 with the rigid handle 40 at a distance from the latter juncture equal to $$\frac{a_w(3a-2a_w)}{6a-3a_w}$$

where $a_w$ is the length of the flexible spring bar 41 from its juncture with the rigid work-engaging head to its juncture with the rigid handle and $a$ is the horizontal dimension along the longitudinal center line of the spring bar 41 from the juncture of the spring bar with the rigid handle to the axis D of rotation of the work-engaging head, as indicated in Fig. 9. The dial gauge may, of course, be carried on the arm 45 and the lug 50 may be carried by the handle 40. A wrench constructed as described with reference to Figs. 9-12 has proven extremely satisfactory and exceedingly accurate.

The sides of the lug 50 and of the shoulders 53 and 54 may be straight as shown in Fig. 11 or may be curved, or the parts, through the engagement between the gauge operating arm and the gauge mechanism may be of other forms, provided that the arrangement is such that the dial gauge will be operated proportionately to the deflection from its normal rest position of a point located on the longitudinal axis of the handle between the axis of rotation of the work-engaging head and the juncture of the spring bar with the rigid handle at the distance from said juncture indicated by the aforementioned formula $$\frac{a_w(3a-2a_w)}{6a-3a_w}$$

Torque measuring wrenches embodying the invention may also be constructed so that the axis of rotation D of the work-engaging head passes through the juncture L of the rigid work-engaging head with the flexible spring bar, whereupon $a_w$ becomes equal to $a$ and the dimension $$\frac{a_w(3a-2a_w)}{6a-3a_w}$$

becomes equal to $$\frac{a}{3}$$

The present application is a continuation of my original application Serial No. 507,827, filed October 27, 1943, now abandoned.

I claim:

1. A torque measuring wrench having a flexible spring bar, a work-engaging head rigidly joining one end of said flexible spring bar, an operating handle rigidly joining the opposite end of said flexible spring bar, and indicating means comprising two members movable relatively to each other during a torque-measuring operation, one moving with the normal axis of the spring bar at the intersection of said axis with a transverse line, the other moving with the intersection of the handle axis with said line, said line being the locus of a series of points, each of which points is the vertex of a pencil of lines formed by the handle axis as the resultant of operating force applied to the handle normal thereto is shifted along the handle axis while maintaining a constant given torque applied to the work, each such pencil of lines being obtained when a different constant torque is applied to the work.

2. A torque measuring wrench having a flexible spring bar, a work-engaging head member having an axis of rotation coincident with the axis of the work rigidly joining one end of said flexible spring bar, a handle member rigidly joining the other end of said flexible spring bar, an indicator supported by one of said members, an actuating element for said indicator supported by the latter member for movement relative thereto, and an actuating element supported by the other member in stationary relation thereto, said actuating elements having mutual engagement at a point located on the longitudinal axis of said handle toward the juncture of the spring bar and work-engaging head and away from the juncture of the spring bar and handle at a distance from the latter juncture substantially equal to $$\frac{a_w(3a-2a_w)}{6a-3a_w}$$

where $a_w$ is the length of the flexible spring bar between said junctures and $a$ is the distance of the juncture of the flexible spring bar and handle from the axis of rotation of said work-engaging head.

3. A torque measuring wrench having a flexible spring bar, a work-engaging head rigidly joining one end of said flexible spring bar, an operating handle rigidly joining the opposite end of said flexible spring bar, an element rigidly secured to said operating head, an element rigid on said handle, a dial gauge device supported by one of said elements, operating mechanism for said dial gauge comprising a member supported on said last-mentioned element for movement relative thereto by the other of said elements as said spring bar is flexed and having engagement with said other element at a point on the normal handle axis substantially spaced from the juncture of the handle with the spring bar in the direction of the work-engaging head, and stop means rigidly associated with one of said elements to engage the other of said elements upon a predetermined magnitude of flexure of said spring bar to prevent over-actuation of said dial gauge mechanism, said elements and stop means being of sufficient strength and rigidity to prevent application of overload to said spring bar.

4. A torque measuring wrench having a flexible spring bar, a work-engaging head rigidly joining one end of said flexible spring bar, an operating handle rigidly joining the opposite end of said flexible spring bar, and torque indicating means comprising two relatively movable members, one moving with a point on the normal axis of the spring bar and the other moving with a point on the handle axis, said points being displaced from the juncture of the spring bar and handle and toward the juncture of the spring bar and work-engaging head to a distance from said first-mentioned juncture substantially equal to $$\frac{a_w(3a-2a_w)}{6a-3a_w}$$

where $a_w$ is the length of the flexible spring bar between said junctures and $a$ is the distance of the juncture of the flexible spring bar and the handle from the axis of rotation of the work-engaging head.

5. A torque measuring wrench comprising a flexible beam, a work-engaging head on one end of said beam, a handle member on the other end of said beam and rigid therewith, said handle member having a point on its axis extended along said beam toward said work-engaging head to a distance from the juncture of the flexible beam and the handle substantially equal to $$\frac{a_w(3a-2a_w)}{6a-3a_w}$$

where $a_w$ is the length of the flexible beam between its juncture with the handle and its juncture with the work-engaging head and $a$ is the distance of the juncture of the handle and the flexible beam from the axis of rotation of the work-engaging head, at which point displacement of said handle axis is substantially constant for a given operating force and is unaffected by variation in the position or manner in which the handle member is engaged to apply operating force thereto, and indicating means comprising two members movable relatively to each other, one with the normal axis of the spring bar and one with the handle axis, in accordance with the displacement of said point on the handle axis from its normal position relative to the normal axis of the spring bar.

6. A torque measuring wrench comprising a work-engaging head, a spring bar rigidly secured at one end to said head, an operating handle comprising a tubular member rigidly secured to the other end of said spring bar at a point spaced from the inner end of the tubular member, said inner end being spaced from said head, said tubular member enclosing said spring bar from said point to said inner end and having an internal diameter larger than the diameter of said spring bar to permit free and unrestricted flexure of the spring bar within the tubular member, a fitting telescoped over and secured to the inner end of the tubular member, a gauge mounted on said fitting, and a cooperating arm rigidly secured to said head.

7. A torque measuring wrench comprising a head member adapted for engagement with the work, a spring bar having one end rigid with and extending from said head member, a handle member adapted to have pressure applied thereto and rigid with the other end of the spring bar, and indicating means comprising a pair of relatively movable elements, each movable with a predetermined point fixed relative to a respective one of said members, said points being located respectively on the normal spring bar axis and on the handle axis intermediate the ends of the spring bar at a distance from the juncture of the handle and the spring bar substantially equal to $$\frac{a_w(3a-2a_w)}{6a-3a_w}$$

where $a_w$ is the length of the spring bar between its juncture with the handle and its juncture with the work-engaging head and $a$ is the distance of the juncture of the handle and the spring bar from the axis of rotation of the work-engaging head, whereby the flexing of the portion (approximately one-third) of the spring bar between said point on the spring bar axis and nearest the handle member due to variations in the manner in which the pressure is applied to the handle member substantially compensates for the variations in flexing of the entire spring bar due to the same cause, whereby such variations of the flexing of the spring bar are prevented from substantially affecting the indicating means.

8. A torque measuring wrench comprising a work-engaging head, a spring bar rigidly secured at one end of said head, an operating handle comprising a tubular member having a portion fitting tightly on and rigidly secured to the other end of said spring bar, said tubular member having another portion extending along the spring bar toward the work-engaging head from said first-mentioned portion and having an internal diameter larger than the diameter of said spring bar to permit free and unrestricted flexure of the spring bar within the tubular member, a gauge rigidly secured to the inner end of said second-mentioned portion, and a cooperating arm rigidly secured to said head.

9. A torque measuring wrench having a flexible spring bar, a work-engaging head rigidly joining said spring bar at one end thereof, an operating handle rigidly joining said spring bar at the opposite end thereof, and torque indicating means comprising two members which are movable relatively to each other and movable respectively with the normal spring bar axis and with the handle axis in accordance with the relative displacements between said axes along a line intersecting the normal spring bar axis at substantially right angles at a point intermediate the juncture of the handle and the spring bar and the juncture of the work-engaging head and the spring bar and substantially removed from each of said junctures.

10. A torque measuring wrench having a flexible spring bar, a work-engaging head rigidly joining said spring bar at one end thereof, an operating handle rigidly joining said spring bar at the opposite end thereof, torque indicating means, means to actuate said indicating means and comprising two members which are movable relatively to each other and movable respectively with the normal spring bar axis and with the handle axis, supporting means for said members immovable relatively to one of said axes, and an element immovable relatively to the other of said axes and having, with that one of said members which is movable with the last-mentioned axis, engagement at a point located on the handle axis intermediate the juncture of the handle and the spring bar and the juncture of the work-engaging head and the spring bar and substantially removed from each of said junctures.

11. A torque measuring wrench having a flexible spring bar, a work-engaging head rigidly joining said spring bar at one end thereof, an operating handle rigidly joining said spring bar at the opposite end thereof, and torque indicating means comprising two members which are movable relatively to each other and movable respectively with the normal spring bar axis and with the handle axis on a line intersecting the handle axis at substantially right angles at a point removed in the direction of the work-engaging head from the juncture of the handle and the spring bar to a distance substantially equal to $$\frac{a_w(3a-2a_w)}{6a-3a_w}$$

where $a_w$ is the length of the flexible spring bar between said junctures and $a$ is the distance of the juncture of the flexible spring bar and handle from the axis of rotation of said work-engaging head.

12. A torque measuring wrench having a flexible spring bar, a work-engaging head rigidly joining said spring bar at one end thereof, an operating handle rigidly joining said spring bar at the opposite end thereof, torque indicating means, and means to actuate said indicating means and comprising two members which are movable relatively to each other and movable respectively with the normal spring bar axis and with the handle axis, supporting means for said members immovable relatively to one of said axes, and an element immovable relatively to the other of said axes and having, with that one of said members which is movable with the last-mentioned axis, engagement at a point located on the handle axis and removed in the direction of the work-engaging head from the juncture of the handle and the spring bar to a distance substantially equal to $$\frac{a_w(3a-2a_w)}{6a-3a_w}$$

where $a_w$ is the length of the flexible spring bar between said junctures and $a$ is the distance of the juncture of the flexible spring bar and handle from the axis of rotation of said work-engaging head.

HENRY ROBERT BILLETER.

REFERENCES CITED

The following references are of record in the file of this patent:

UNITED STATES PATENTS

| Number | Name | Date |
| --- | --- | --- |
| 2,159,354 | Dunn | May 23, 1939 |
| 2,167,720 | Kress | Aug. 1, 1939 |
| 2,289,238 | Brunelle | July 7, 1942 |
| 2,315,521 | Hart | Apr. 6, 1943 |